United States Patent
Baltes

(10) Patent No.: US 8,517,153 B2
(45) Date of Patent: Aug. 27, 2013

(54) SUSPENSION DAMPING VALVE

(75) Inventor: Jeffrey J. Baltes, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 1048 days.

(21) Appl. No.: 11/842,824

(22) Filed: Aug. 21, 2007

(65) Prior Publication Data

US 2009/0051086 A1 Feb. 26, 2009

(51) Int. Cl.
*F16F 9/50* (2006.01)
*F16F 9/34* (2006.01)

(52) U.S. Cl.
USPC .................................. 188/282.6; 188/322.13

(58) Field of Classification Search
USPC ............ 188/280, 281, 282.1, 322.13, 322.15, 188/275, 313, 316, 317, 319.1, 282.5, 282.6; 137/493.8
See application file for complete search history.

(56) References Cited

U.S. PATENT DOCUMENTS 4,060,155 A * 11/1977 Duckett ...................... 188/282.6
4,232,767 A * 11/1980 De Kock .................... 188/282.5
4,972,929 A * 11/1990 Ivers et al. ................ 188/322.15
6,615,960 B1    9/2003 Turner
7,163,222 B2    1/2007 Becker

FOREIGN PATENT DOCUMENTS

JP            02085531     *  3/1990

* cited by examiner

*Primary Examiner* — Bradley King
*Assistant Examiner* — Vishal Sahni
(74) *Attorney, Agent, or Firm* — Milan Milosevic; Lisa Serdynski; Steven Courtright

(57) ABSTRACT

A valve for a suspension damping system having a valve body and a shim valve assembly that permits fluid flow in two directions. The valve body separates a first fluid chamber from a second fluid chamber and has at least one fluid port therethrough between the first and second chambers. The shim valve assembly is coupled to the valve body and configured to control fluid flow across the valve body. The shim valve assembly includes a first shim having at least one fluid port and a second shim configured to seal the first shim fluid port. The first and second shims are flexible in a first direction under fluid pressure to permit fluid flow between the first and second fluid chambers, providing a first resistance to fluid flow. The second shim seals fluid flow through the first shim fluid port during flow in the first direction. The second shim is flexible in a second direction under fluid pressure to permit fluid flow between first and second fluid chambers, providing a second resistance to fluid flow. The second shim permits fluid flow through the first shim fluid port during flow in the second direction.

31 Claims, 9 Drawing Sheets

SUSPENSION DAMPING VALVE

BACKGROUND OF THE INVENTION

The present invention relates to valves and more particularly to a two-way valve for a suspension damping system, the valve including a shim valve assembly that is flexible in two directions to permit fluid flow therethrough in the two directions.

SUMMARY OF THE INVENTION

The present invention provides a two-way valve generally including a valve body and a shim valve assembly. The valve body separates a first fluid chamber from a second fluid chamber. The valve body includes at least one fluid port therethrough between the first and second fluid chambers.

The shim valve assembly is coupled to the valve body and configured to control fluid flow through the valve body. The shim valve assembly includes a first shim having at least one fluid port and a second shim configured to seal the first shim fluid port. The first and second shims are flexible in a first direction under fluid pressure to permit fluid flow between the first and second chambers, providing a first resistance to fluid flow. The second shim is configured to seal fluid flow through the first shim fluid port during flow in the first direction. The second shim is flexible in a second direction under fluid pressure to permit fluid flow between the first and second fluid chambers, providing a second resistance to fluid flow. The second shim is configured to permit fluid flow through the first shim fluid port during flow in the second direction.

The first resistance to fluid flow may be greater than the second resistance. The first shim may adjoin the second shim. The second shim may include at least one tab, the tab configured to seal the first shim fluid port during the flow in the first direction and to permit fluid flow though the first shim port during flow in the second direction.

In another embodiment of the invention, the first shim may be preloaded to be inflexible in the first direction below a cutoff fluid pressure to seal fluid flow between the first and second fluid chambers, and flexible in the first direction above the cutoff fluid pressure to permit fluid flow between the first and second fluid chambers.

In another embodiment of the present invention, the valve may include a fluid passageway thereacross to permit fluid flow in the first and second directions. The first shim may be configured to seal the valve body at a periphery of the first shim to seal fluid flow between the first and second fluid chambers across the first shim periphery when the first shim is unflexed. In another embodiment of the present invention, the valve body may be slidably mounted within a tube of the suspension damping system.

These and other features and advantages of the present invention will be more fully understood from the following description of one or more embodiments of the invention, taken together with the accompanying drawings.

DETAILED DESCRIPTION

Figure 1:
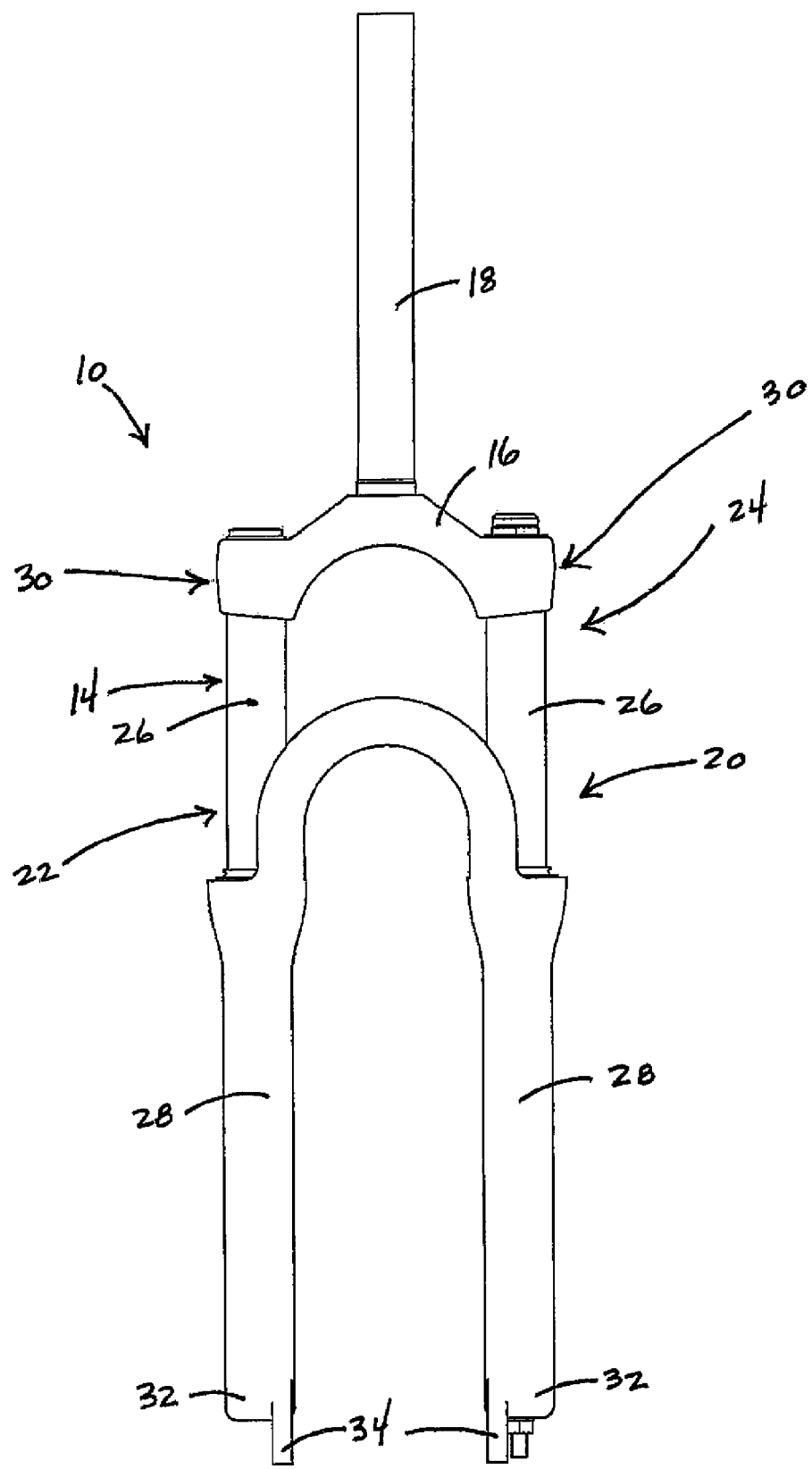
FIG. 1 is a front view of a suspension fork including a valve according to one embodiment of the present invention.

FIGS. 1-6 illustrate a suspension fork 10 that includes a valve 12 for a damping system 14 according to one embodiment of the present invention. It is understood that although the valve of the present invention is described with respect to a suspension fork, it may also be embodied in other applications requiring a valve. Looking to FIG. 1, the suspension fork 10 includes a crown 16 connected to a steerer tube 18, a first leg 20 and a second leg 22. The suspension fork 10 may include a spring system 24 in the first leg 20 and the damping system 14 in the second leg 22. Each of the legs 20, 22 typically includes an upper tube 26 and a lower tube 28. Although the upper tubes 26 are shown as inner tubes slidable within the lower outer tubes 28, it will be appreciated that the lower tubes may alternatively be configured as inner tubes slidable within upper outer tubes. Additionally, although the tubes 26, 28 are shown to have substantially circular cross sections, it is understood that they may be configured into alternative cross-sectional shapes. The upper and lower tubes 26, 28 are connected at their remote ends 30 to the crown 16, and at their remote ends 32 to a wheel axle (not shown) through dropouts 34.

Figure 2:
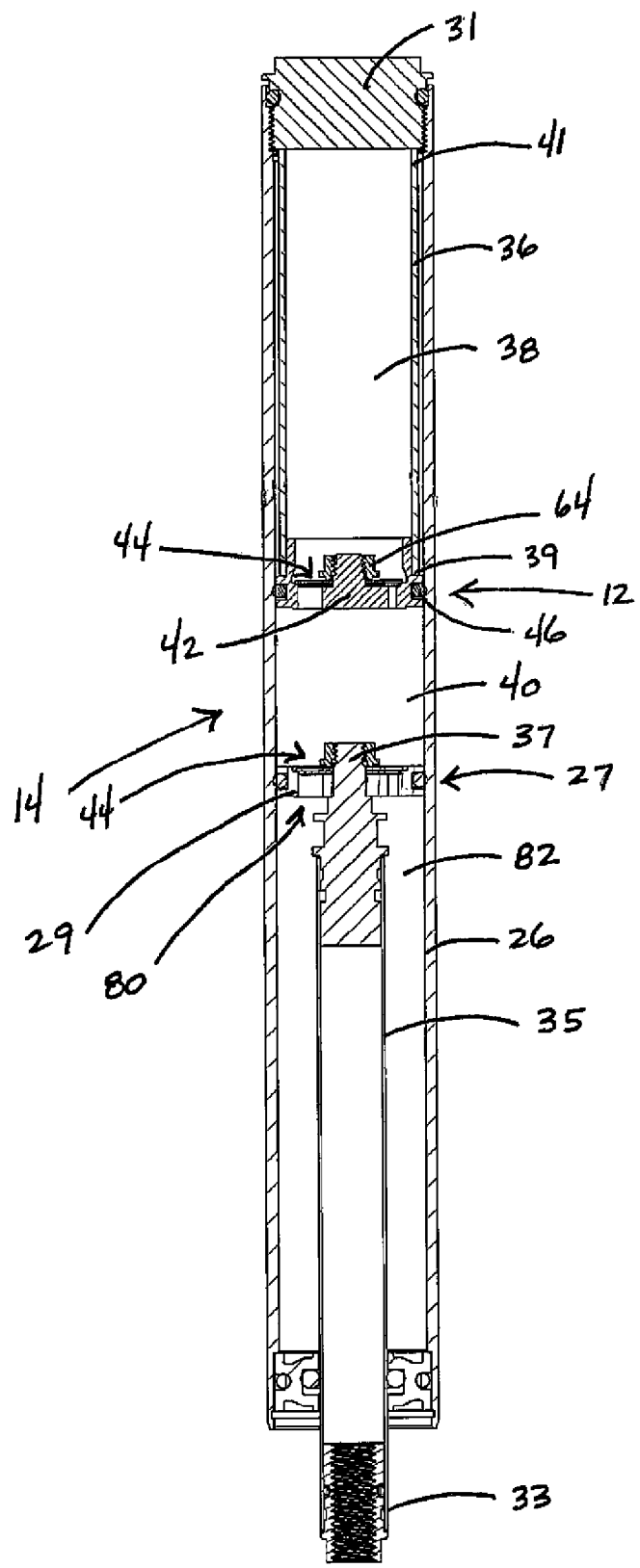
FIG. 2 is a cross-sectional view of the valve disposed in an upper tube of the suspension fork of FIG. 1.

Looking to FIG. 2, the damping system 14 generally includes a fluid-displacing assembly 27 and the valve 12 that, in this embodiment, functions as a compression valve. The fluid-displacing assembly, in this embodiment a piston assembly 27, includes a piston 29 and a shaft 35. The piston 29 is slidably mounted within the upper tube 26. One end 33 of the shaft 35 is secured to the lower tube 28 and other end 37 extends into the upper tube 26. The valve 12 is attached to one end 39 of a damping tube 36 disposed in the upper tube 26. The other end 41 of the damping tube 36 is secured to the upper tube 36 by cap 31. The valve 12 flexes in a first direction $A_2$ and a second direction $B_2$ to control fluid flow between a first fluid chamber 38 and a second fluid chamber 40 (see FIGS. 5 and 6). The valve 12 generally includes a valve body 42 and a shim valve assembly 44.

Figure 3:
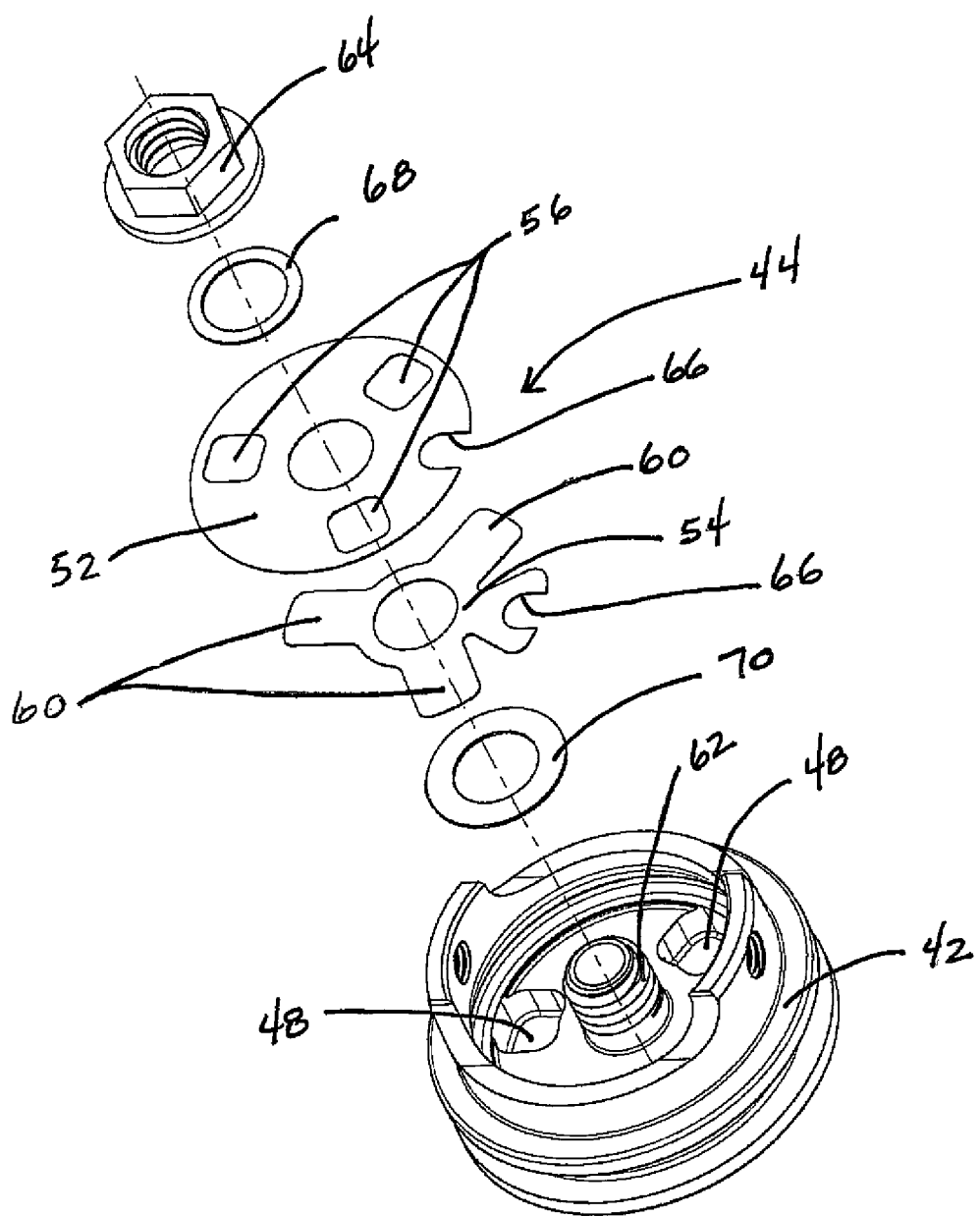
FIG. 3 is an exploded view of the valve of FIG. 2.

Looking to FIGS. 2 and 3, the valve body 42 is attached to end 39 of the damping tube 36 and separates the first fluid chamber 38 from the second fluid chamber 40. In this embodiment, the valve body 42 is sealed against the upper tube 26 by a seal 46. Fluid ports 48 through the valve body 42 connect the first and second fluid chambers 38, 40. The valve body 42 may also include a fluid passageway 50 therethrough between the first and second fluid chambers 38, 40 to permit fluid flow in both directions $A_1$ and $B_1$ (see FIGS. 4-6).

The shim valve assembly 44 generally includes first and second shims 52, 54 that may be adjoining. The first shim 52 includes fluid ports 56. A periphery of the first shim 52 seals against a step 58 of the valve body 42 to seal fluid flow between the first and second fluid chambers 38, 40 at the first shim periphery when the first shim 52 is unflexed (see FIG. 4). The second shim 54 may include tabs 60 configured to seal the first shim fluid ports 56 when the first and second shims 52, 54 are stacked onto a stem 62 of the valve body 42. A nut 64 is threaded onto the stem 62 to secure the shims 52, 54 to the valve body 42. Shims 52, 54 may include a fluid passageway therethrough between the first and second fluid chambers 38, 40 to permit fluid flow in both directions $A_1$ and $B_1$ (see FIGS. 4-6). In this embodiment, the shim fluid passageway includes notches 66 configured to align with the fluid passageway 50 in the valve body 20. In this embodiment, a fluid passageway across the valve 12 includes the fluid passageway 50 in the valve body 42 and notches 66 in the first and second shims 52, 54. In alternative embodiments, the fluid passageway across the valve 12 may include passageways bypassing the valve body 42 and the first and second shims 52, 54. In this embodiment, a single first shim 52 is shown, but it is understood that a plurality of similar shims may be used to change the damping characteristics of the fork 10. The shims 52, 54 may be made from flexible steel or similar materials.

The damping characteristics may also be adjusted by providing a tuning shim 68, shown sandwiched between first shim 52 and nut 64. The flexibility of deflected shims 52, 54 may be adjusted by changing the diameter and thickness of the tuning shim 68, or alternatively, by using a plurality of tuning shims 68. The shim valve assembly 44 may also include a preload shim 70, shown sandwiched between the second shim 54 and the valve body 42. The thickness of preload shim 70 may be adjusted to preload the first shim 52 against the step 58 of valve body 42 to be inflexible in the first direction $A_2$ below a cutoff fluid pressure to seal fluid flow between the first and second fluid chambers 38, 40 (see FIG. 4), and to be flexible in the first direction $A_2$ above the cutoff fluid pressure to permit fluid flow between the first and second chambers 38, 40 (see FIG. 5). It is understood that the damping characteristics in either flow direction can be adjusted by changing the quantity, order, thickness or diameter of the shims, and likewise, by changing the quantity, size and shape of the ports, passageways and tabs.

Figure 4:
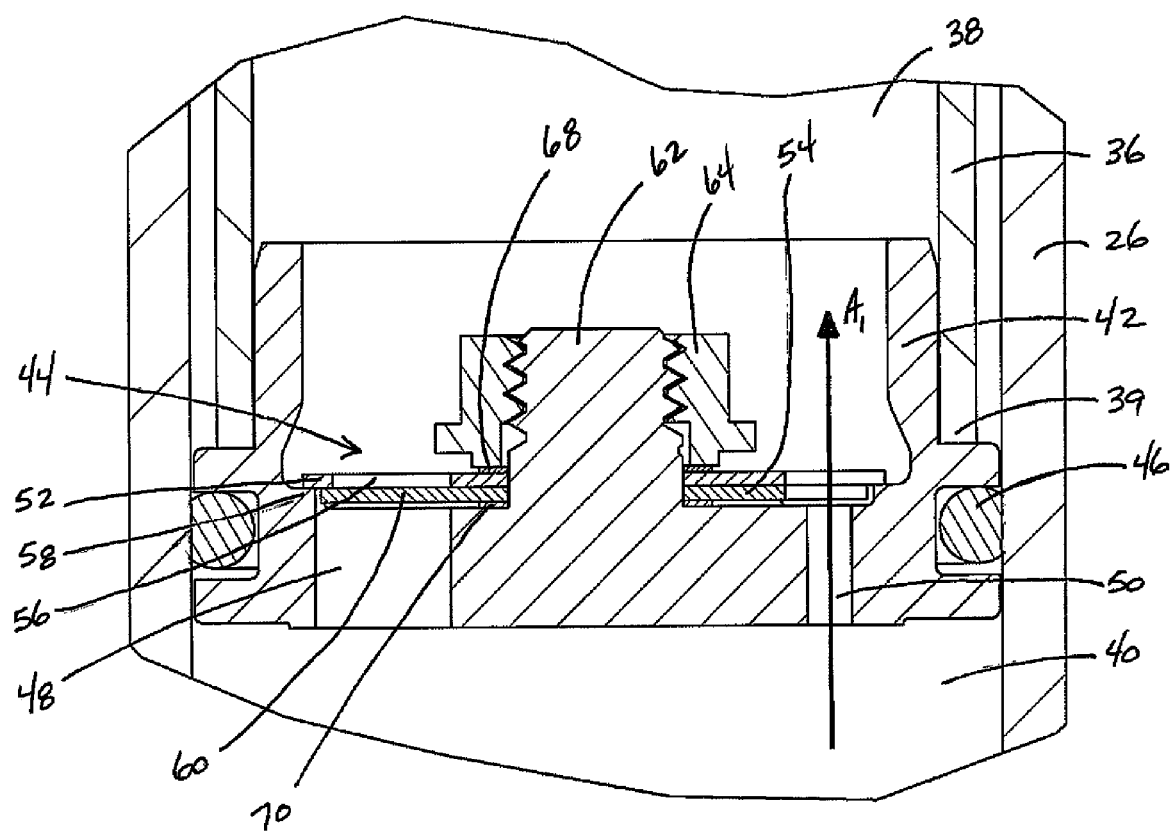
FIG. 4 is a partial cross-sectional view of the valve of FIG. 2 during low speed compression flow.

Looking to FIG. 4, an embodiment having a preloaded first shim 52 under low-speed compression is illustrated. During low-speed compression of the fork 10, the shaft 35 displaces toward the valve body 42 causing fluid flow in a direction $A_1$ from the second chamber 40, through the fluid passageway 50 and the notches 66 of the first and second shims 52, 54, and into the first fluid chamber 38. The tabs 60 are configured to seal fluid flow through the fluid ports 56 of the first shim 52. In this instance, the fluid pressure in the second fluid chamber 40 has not reached a cutoff pressure necessary to flex the first and second shims 52, 54 in a first direction to permit fluid through the fluid ports 48 of the valve body 42.

Figure 5:
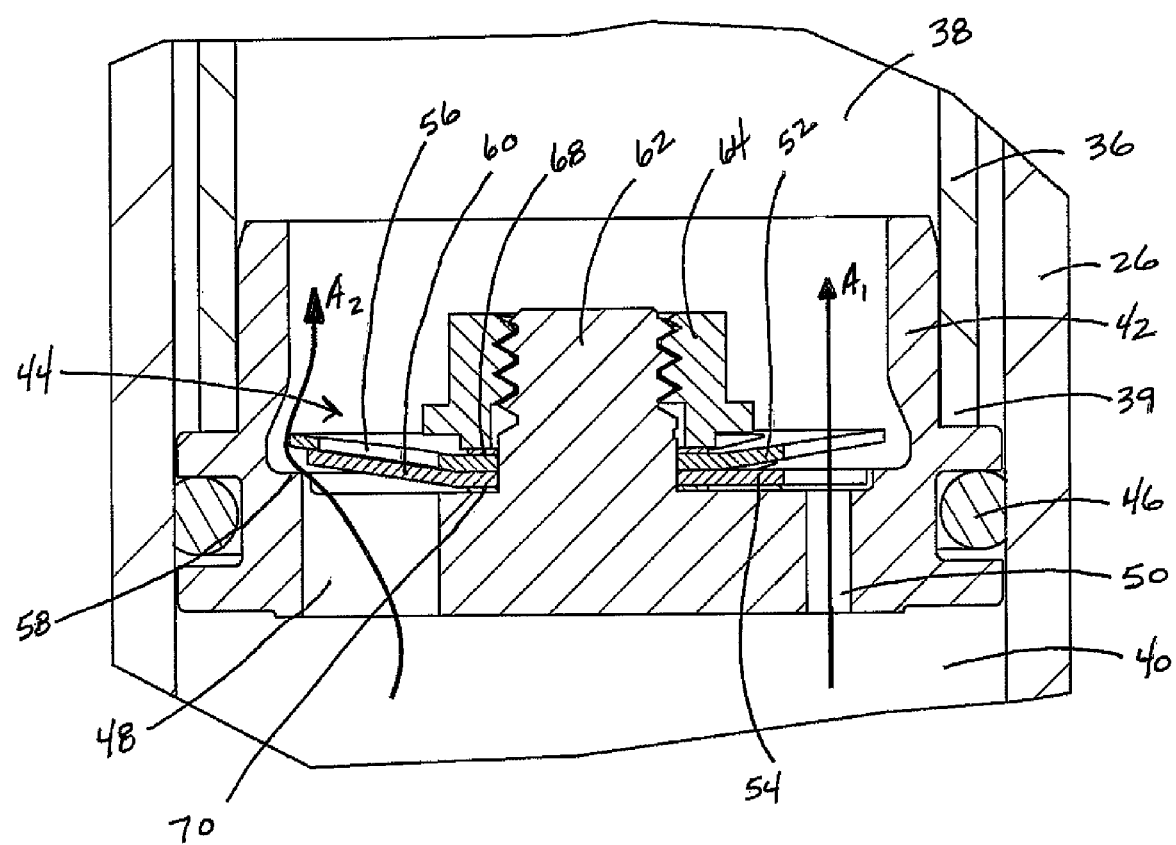
FIG. 5 is a partial cross-sectional view of the valve of FIG. 2 during high speed compression flow.

Looking to FIG. 5, during high-speed compression of the fork 10, the shaft 35 displaces toward the valve body 42 at a higher rate causing fluid flow through fluid ports 48 in addition to flow through the fluid passageway 50. In this instance, the fluid pressure in the second fluid chamber 40 has exceeded the cutoff pressure, thereby flexing the first and second shims 52, 54 in the first direction to permit fluid flow from the second fluid chamber 40 to the first fluid chamber 38 through the fluid ports 48 but not through fluid ports 56 in the first shim 52 which continue to be sealed by tabs 60 of the second shim 54, even when flexed. The flexed first and second shims 52, 54 provide a first resistance to fluid flow through the fluid ports 48 in the first direction $A_2$. In an embodiment of the invention without a preloaded first shim 52, the first and second shims 52, 54 would deflect as shown in FIG. 5 under both low and high-speed compression flow.

Figure 6:
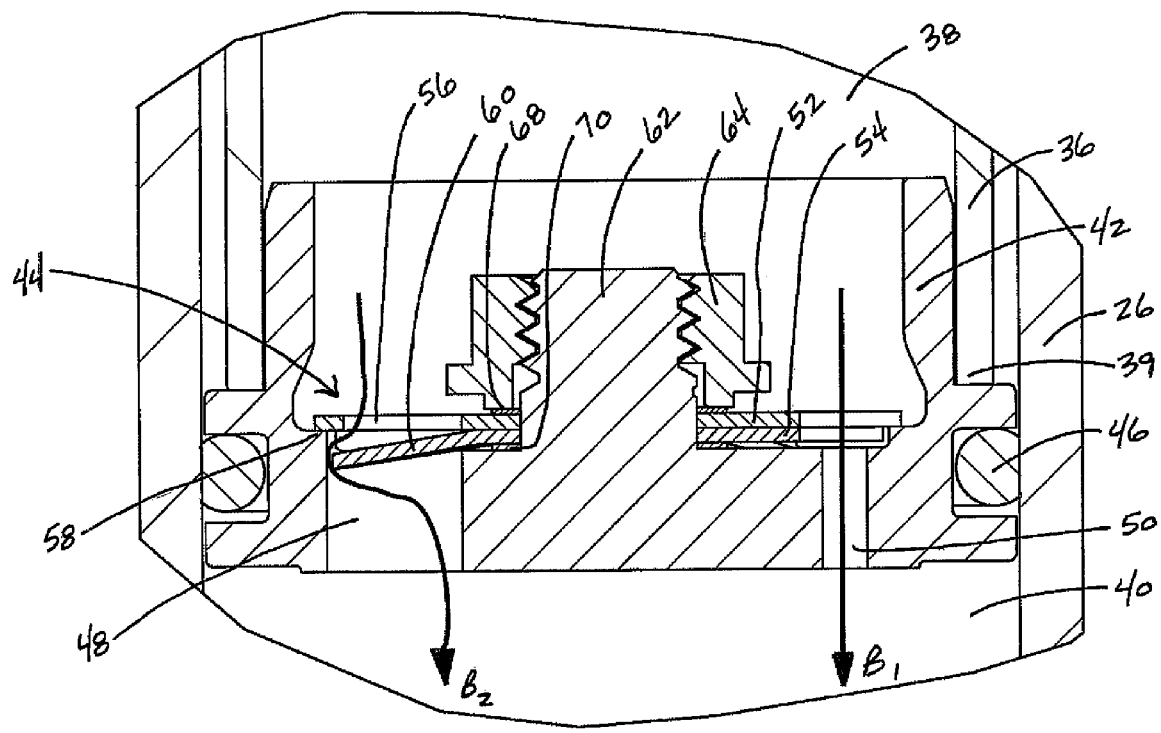
FIG. 6 is a partial cross-sectional view of the valve of FIG. 2 during rebound flow.

Looking to FIG. 6, during rebound of the fork 10, the shaft 35 displaces away from the valve body 42 causing fluid to return to the second chamber 40, from the first chamber 38, through the fluid passageway 50 and additionally through the fluid ports 56 in the first shim 52 by flexing the tabs 60 of the second shim 54 in the second direction to permit fluid flow through the fluid ports 48 of the valve body 42. The tabs 60 of the second shim 54 provide a second resistance to fluid flow through the fluid ports 48 in the second direction $B_2$. The first resistance to fluid flow provided by the first and second shims 52, 54 may be greater than the second resistance to fluid resistance provided by the tabs 60 of the second shim 54.

Figure 7:
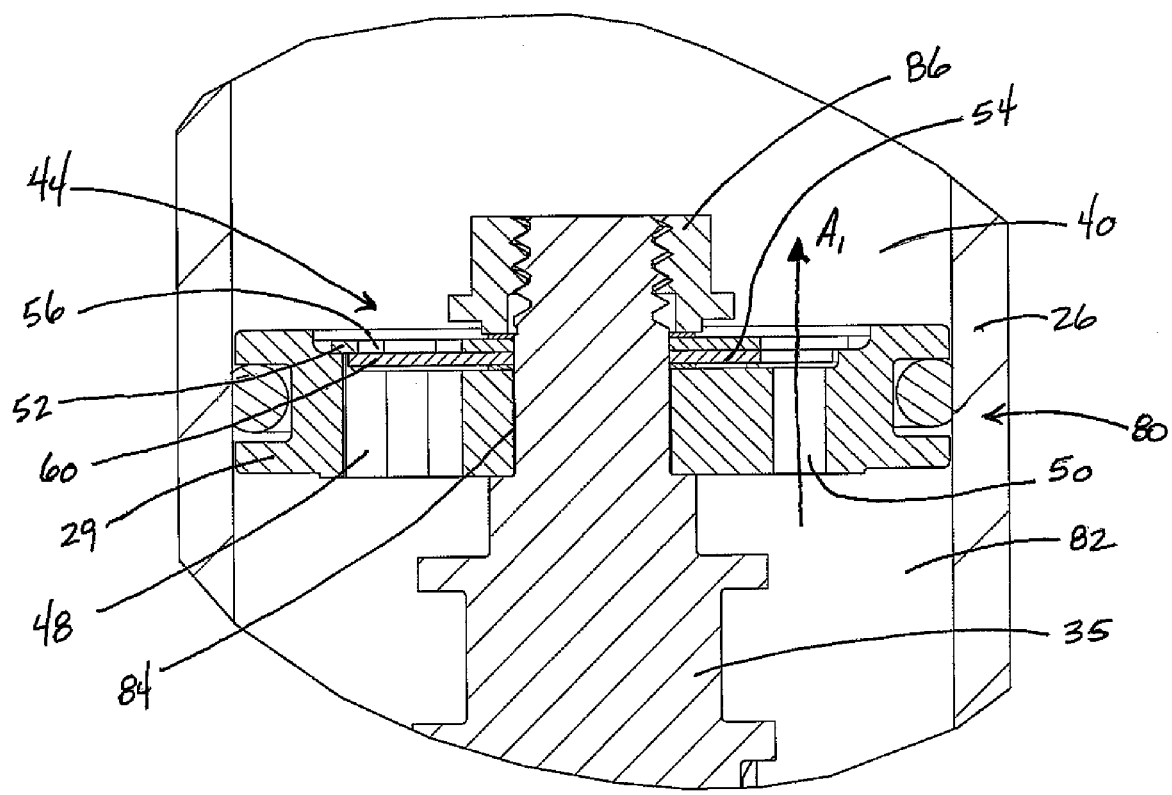
FIG. 7 is a partial cross-sectional view a valve according to another embodiment of the present invention.

Looking to FIGS. 2 and 7, the piston 29 may include a rebound valve 80 according to another embodiment of the invention. The valve 80 is similar to the valve 12, except that the slidable piston 29 functions as the valve body and the shims 52, 54 flex to control fluid flow between the second fluid chamber 40 and a third fluid chamber 84. Additionally, the piston 29 includes a bore 84 for receiving the shaft 35 therethrough. The shims 52, 54 are stacked on the piston 29 and the shaft 35. A nut 86 is threaded onto the end 37 of the shaft 35 to secure the shims 52, 54 to the piston 29. In the embodiment of rebound valve 80, low speed compression flow through fluid passageway 50 occurs under the rebound stroke of the fork 10.

Figure 8:
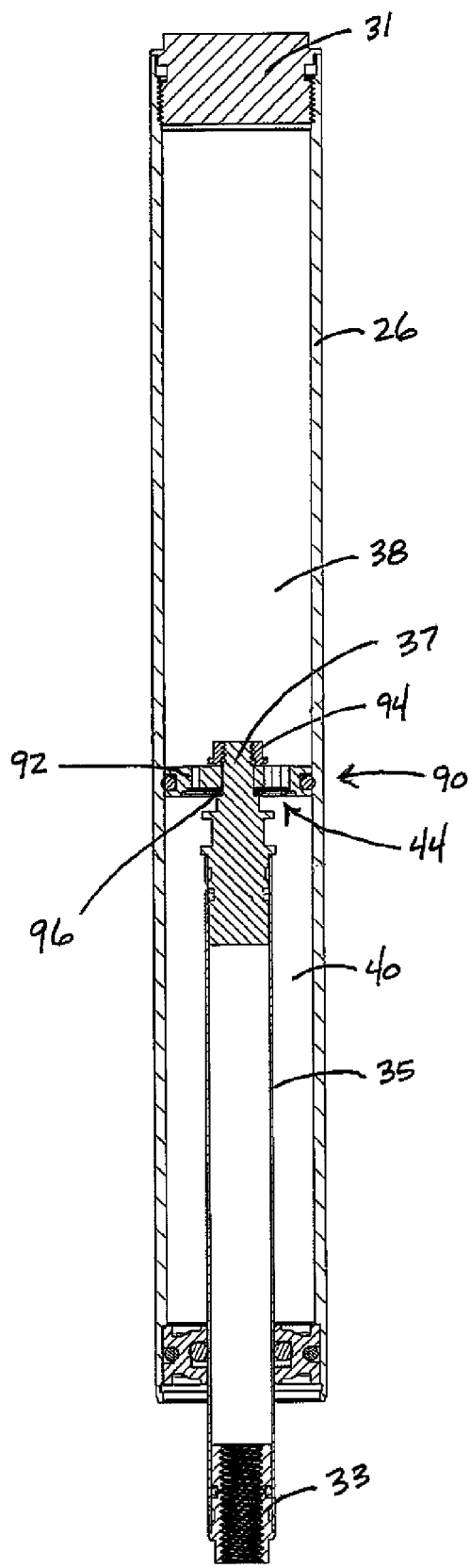
FIG. 8 is a cross-sectional view of a valve according to another embodiment of the present invention.
Figure 9:
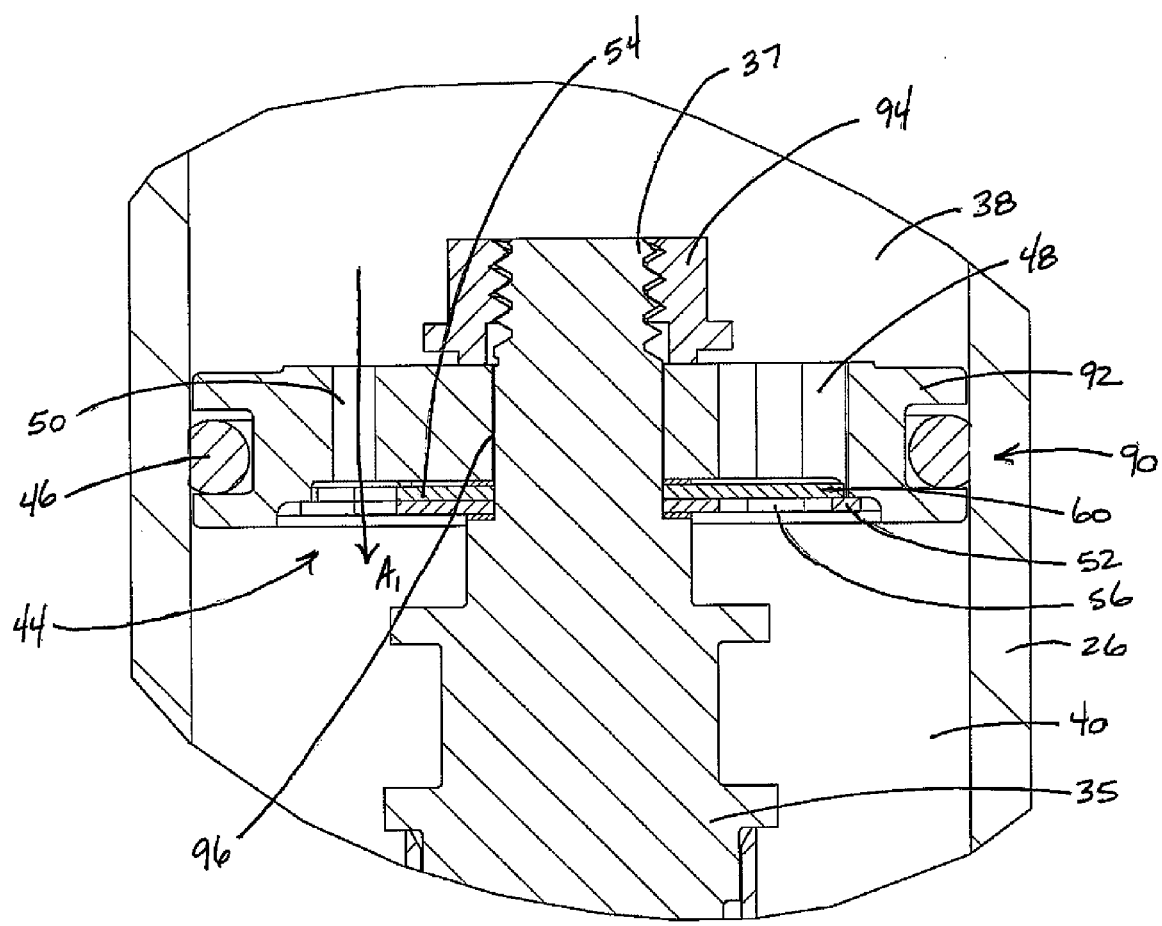
FIG. 9 is a partial cross-sectional view of the valve of FIG. 8.

FIGS. 8 and 9 illustrate a valve 90 according to another embodiment of the present invention wherein the valve 90 is similar to the valve 12 shown in FIGS. 1-6 except that a valve body 92 functions as a piston slidably mounted within the upper tube 26. Additionally, the valve body 92 includes a bore 96 for receiving the shaft 35 therethrough. The shims 52, 54 are stacked on the valve body 92 and the shaft 35. A nut 94 is threaded onto the end 37 of the shaft 35 to secure the shims 52, 54 to the valve body 92. In the embodiment of compression valve 90, low speed compression flow through fluid passageway 50 occurs under the compression stroke of the fork 10.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A valve for a suspension damping system, the valve comprising:
   a valve body separating a first fluid chamber from a second fluid chamber, the valve body having at least one fluid port therethrough between the first and second fluid chambers;
   a shim valve assembly coupled to the valve body and configured to control fluid flow across the valve body, the shim valve assembly including:
   a first shim having at least one fluid port, and
   a second shim, wherein the second shim includes at least one tab configured to seal the first shim fluid port,
   the first and second shims configured to flex in a first direction under fluid pressure to permit fluid flow between the first and second fluid chambers, providing a first resistance to fluid flow, the at least one tab of the second shim sealing fluid flow through the first shim fluid port during flow in the first direction,
   only the second shim configured to flex in a second direction under fluid pressure to permit fluid flow between the first and second fluid chambers, providing a second resistance to fluid flow, the at least one tab of the second shim permitting fluid flow through the first shim fluid port during flow in the second direction; and
   a fluid passageway formed through the first and second shims and valve body to permit fluid flow in both first and second directions between the first and second fluid chambers without displacing the first or second shims.

2. The valve of claim 1, wherein the first resistance is greater than the second resistance.

3. The valve of claim 2, wherein the first shim adjoins the second shim.

4. The valve of claim 1, wherein the first shim is preloaded to be inflexible in the first direction below a cutoff fluid pressure to seal fluid flow between the first and second fluid chambers, and flexible in the first direction above the cutoff fluid pressure to permit fluid flow between the first and second fluid chambers.

5. The valve of claim 1, wherein the first shim is configured to seal the valve body at a periphery of the first shim to seal fluid flow between the first and second fluid chambers across the first shim periphery when the first shim is unflexed.

6. The valve of claim 1, wherein the valve body is slidably mounted within a tube of the suspension damping system.

7. The valve of claim 6, wherein the first resistance is greater than the second resistance.

8. The valve of claim 7, wherein the first shim adjoins the second shim.

9. The valve of claim 8, wherein the first shim is preloaded to be inflexible in the first direction below a cutoff fluid pressure to seal fluid flow between the first and second fluid chambers, and flexible in the first direction above the cutoff fluid pressure to permit fluid flow between the first and second fluid chambers.

10. The valve of claim 8, wherein the first shim is configured to seal the valve body at a periphery of the first shim to seal fluid flow between the first and second fluid chambers across the first shim periphery when the first shim is unflexed.

11. The valve of claim 1, wherein the first shim adjoins the second shim.

12. A suspension damping system comprising:
a valve body separating a first fluid chamber from a second fluid chamber, the valve body having at least one fluid port therethrough between the first and second fluid chambers;
a shim valve assembly coupled to the valve body and configured to control fluid flow across the valve body, the shim valve assembly including:
a first shim having at least one fluid port, and
a second shim, wherein the second shim includes at least one tab configured to seal the first shim fluid port,
the first and second shims configured to flex in a first direction under fluid pressure to permit fluid flow between the first and second fluid chambers, providing a first resistance to fluid flow, the at least one tab of the second shim sealing fluid flow through the first shim fluid port during flow in the first direction,
only the second shim configured to flex in a second direction under fluid pressure to permit fluid flow between the first and second fluid chambers, providing a second resistance to fluid flow, the at least one tab of the second shim permitting fluid flow through the first shim fluid port during flow in the second direction;
a fluid-displacing assembly reciprocally displaceable relative to the valve body; and
a fluid passageway across the valve body and through the shim valve assembly to permit fluid flow in both first and second directions between the first and second fluid chambers without displacing the first or second shims.

13. The damping suspension system of claim 12, wherein the first resistance is greater than the second resistance.

14. The damping suspension system of claim 13, wherein the first shim adjoins the second shim.

15. The damping suspension system of claim 12, wherein the first shim is preloaded to be inflexible in the first direction below a cutoff fluid pressure to seal fluid flow between the first and second fluid chambers, and flexible in the first direction above the cutoff fluid pressure to permit fluid flow between the first and second fluid chambers.

16. The damping suspension system of claim 12, wherein the first shim is configured to seal the valve body at a periphery of the first shim to seal fluid flow between the first and second fluid chambers across the first shim periphery when the first shim is unflexed.

17. The damping suspension system of claim 12, wherein the first shim adjoins the second shim.

18. A valve for a suspension damping system, the valve comprising:
means for separating a first fluid chamber from a second fluid chamber, the separating means having at least one fluid port formed therethrough between the first and second fluid chambers;
means for controlling fluid flow across the separating means, the fluid control means coupled to the separating means and including:
a first shim having at least one fluid port formed therethrough, and
a second shim, wherein the second shim includes at least one tab configured to seal the first shim fluid port,
the first and second shim being configured for flexing in a first direction under fluid pressure to permit fluid flow between the first and second fluid chambers, providing a first resistance to fluid flow, the at least one tab of the second shim sealing fluid flow through the first shim fluid port during flow in the first direction,
only the second shim configured for flexing in a second direction under fluid pressure to permit fluid flow between the first and second fluid chambers, providing a second resistance to fluid flow, the at least one tab of the second shim permitting fluid flow through the first shim fluid port during flow in the second direction; and
a fluid passageway formed through the first and second shims and valve body to permit fluid flow in both first and second directions between the first and second fluid chambers without displacing the first or and second shims.

19. The valve of claim 18, wherein the first resistance is greater than the second resistance.

20. The valve of claim 19, wherein the first shim adjoins the second shim.

21. The valve of claim 18, wherein the first shim is preloaded to be inflexible in the first direction below a cutoff fluid pressure to seal fluid flow between the first and second fluid chambers, and flexible in the first direction above the cutoff fluid pressure to permit fluid flow between the first and second fluid chambers.

22. The valve of claim 21, wherein the first shim is configured to seal the separating means at a periphery of the first shim to seal fluid flow between the first and second fluid chambers across the first shim periphery when the first shim is unflexed.

23. The valve of claim 18, wherein the separating means is slidably mounted within a tube of the suspension damping system.

24. The valve of claim 23, wherein the first resistance is greater than the second resistance.

25. The valve of claim 24, wherein the first shim adjoins the second shim.

26. The valve of claim 25, wherein the first shim is preloaded to be inflexible in the first direction below a cutoff fluid pressure to seal fluid flow between the first and second fluid chambers, and flexible in the first direction above the cutoff fluid pressure to permit fluid flow between the first and second fluid chambers.

27. The valve of claim 25, wherein the first shim is configured to seal the separating means at a periphery of the first shim to seal fluid flow between the first and second fluid chambers across the first shim periphery when the first shim is unflexed.

28. The valve of claim 18, wherein the first shim adjoins the second shim.

29. The valve of claim 18, wherein the first shim is configured to seal the separating means at a periphery of the first shim to seal fluid flow between the first and second fluid chambers across the first shim periphery when the first shim is unflexed.

30. The valve of claim 1, wherein the second shim flexes away from the first shim in the second direction.

31. The valve of claim 18, wherein the second shim flexes away from the first shim in the second direction.

* * * * *